(12) United States Patent
Plickys et al.

(10) Patent No.: US 9,366,141 B2
(45) Date of Patent: Jun. 14, 2016

(54) PROPELLER ROTOR BALANCING SYSTEM

(71) Applicant: Hamilton Sundstrand Corporation, Windsor Locks, CT (US)

(72) Inventors: Mark A. Plickys, Unionville, CT (US); Paul A. Carvalho, Hadley, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 806 days.

(21) Appl. No.: 13/713,015

(22) Filed: Dec. 13, 2012

(65) Prior Publication Data

US 2014/0169961 A1 Jun. 19, 2014

(51) Int. Cl.
| | |
|---|---|
| *B64C 11/00* | (2006.01) |
| *F01D 5/02* | (2006.01) |
| *F01D 5/26* | (2006.01) |
| *F01D 15/10* | (2006.01) |
| *F01D 17/02* | (2006.01) |

(52) U.S. Cl.
CPC .............. *F01D 5/027* (2013.01); *B64C 11/008* (2013.01); *F01D 5/26* (2013.01); *F01D 15/10* (2013.01); *F01D 17/02* (2013.01)

(58) Field of Classification Search
None
See application file for complete search history.

(56) References Cited

U.S. PATENT DOCUMENTS

| | | |
|---|---|---|
| 4,724,708 A | 2/1988 | Okano et al. |
| 5,304,038 A | 4/1994 | MacMurray |
| 5,791,595 A | 8/1998 | Jamieson |
| 5,823,466 A | 10/1998 | Jamieson |
| 6,123,623 A | 9/2000 | Sugiyama |
| 7,249,508 B2 | 7/2007 | Rogalla et al. |
| 8,167,553 B2 | 5/2012 | Perkinson et al. |
| 8,172,530 B2 | 5/2012 | Perkinson |
| 8,267,656 B2 | 9/2012 | Carvalho et al. |
| 8,277,182 B2 | 10/2012 | Perkinson |
| 8,961,140 B2 * | 2/2015 | Badre-Alam ......... B64C 11/008 416/144 |
| 2009/0236468 A1 | 9/2009 | Welsh |
| 2011/0290942 A1 | 12/2011 | Imbert et al. |

FOREIGN PATENT DOCUMENTS

WO  2012051475 A1  4/2012

OTHER PUBLICATIONS

European Search Report for European Patent Application No. 13192271.8 completed on Jul. 25, 2014.

* cited by examiner

*Primary Examiner* — Nathaniel Wiehe
*Assistant Examiner* — Jason Davis
(74) *Attorney, Agent, or Firm* — Carlson, Gaskey & Olds, PC

(57) ABSTRACT

A propeller rotor has a hub mounting a plurality of blades and a drive shaft for driving the hub and the blades about a central axis. A motor to change its position is operably connected to drive at least one counterweight. A sensor senses vibration on the propeller rotor and communicates with a controller. The controller controls the motor to change a position of the counterweight in response to a sensed imbalance. A method of operating a propeller rotor is also disclosed.

12 Claims, 1 Drawing Sheet

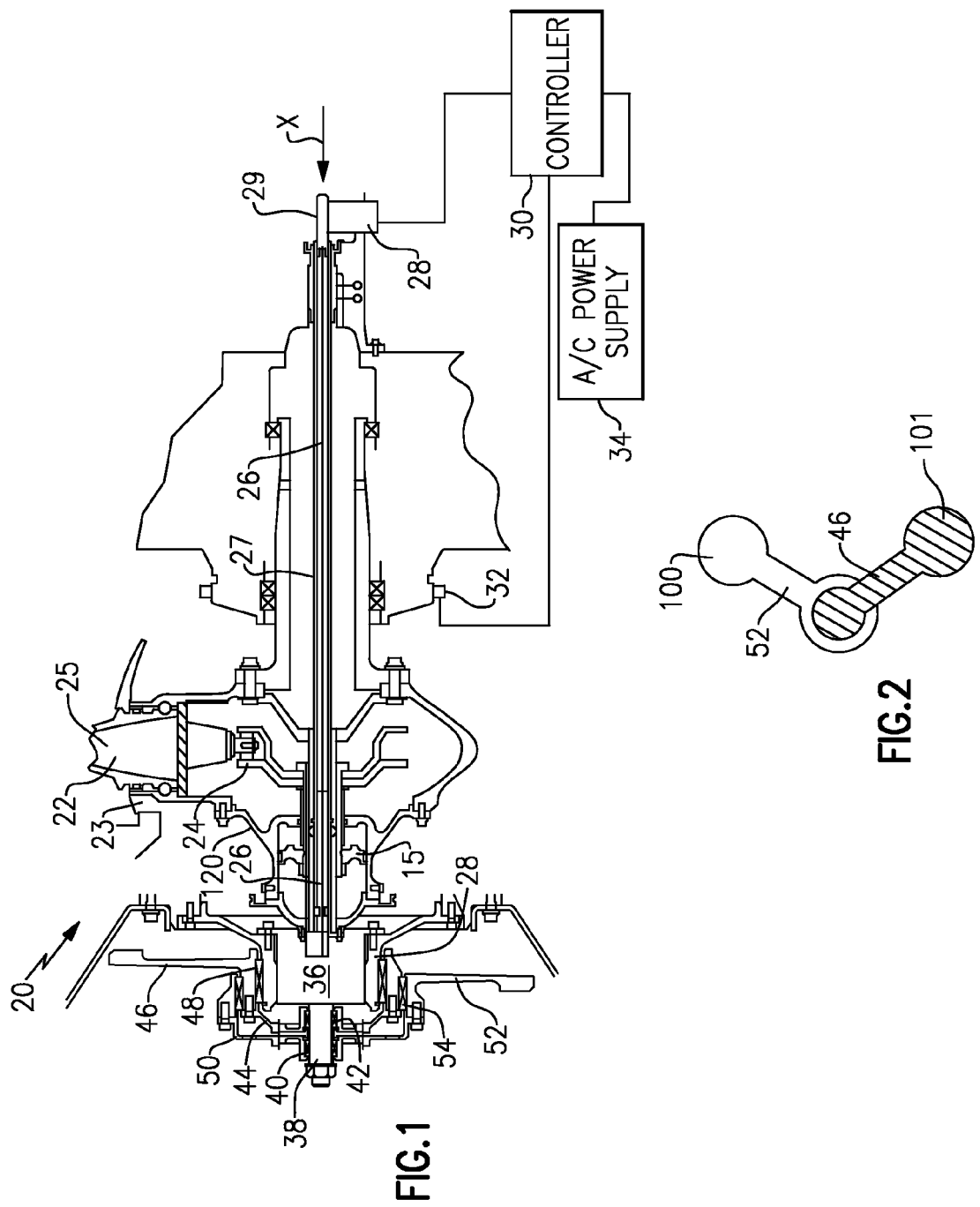

PROPELLER ROTOR BALANCING SYSTEM

BACKGROUND OF THE INVENTION

This application relates to a balancing system for moving counterweights to correct for an imbalance on a propeller rotor.

Propeller rotors typically include a plurality of propeller blades which can be driven as a unit about a central axis. The blades all have airfoils and roots which are mounted within a structure in the hub.

Propeller rotors are subject to vibration and imbalance. Counterweights have been associated with the rotor and serve to correct the imbalance. The counterweights have typically been added at assembly of the propeller rotor and have thus been designed to balance the rotor as originally manufactured.

However, with use and under various flight conditions, the propeller rotor may change somewhat, such that the previous position for the counterweights is no longer the proper one.

SUMMARY OF THE INVENTION

A propeller rotor has a hub mounting a plurality of blades and a drive shaft for driving the hub and the blades about a central axis. A motor to change its position is operably connected to drive at least one counterweight. A sensor senses vibration on the propeller rotor and communicates with a controller. The controller controls the motor to change a position of the counterweight in response to a sensed imbalance.

These and other features may be best understood from the following drawings and specification.

BRIEF DESCRIPTION OF THE DRAWINGS

FIG. 1 shows a propeller rotor.

FIG. 2 schematically shows a feature of counterweights associated with this application.

DETAILED DESCRIPTION

A propeller rotor 20 is illustrated in FIG. 1. A plurality of blades 22 are mounted within mount locations 23. A cylinder 120 receives a piston 15 for moving a pitch change mechanism 24, which is operable to change the pitch or angle of an airfoil 25 associated with the blade 22.

The propeller rotor 20 is provided with a balance sensor 32 that can sense imbalance or undue vibration during operation of the propeller rotor 20. The balance sensor 32 communicates with a controller 30 which is supplied with power from an AC power supply 34. A power transfer brush block 28 communicates with slip rings 29 and to power supply wires 26. Thus, although the ring 29 and power supply wires 26 rotate with the propeller rotor, the power supply 34, controller 30 and brush block 28 may all be stationary. Wires 26 are received with conduit 27, which also rotates and is centered on a rotational axis X of rotor 20.

The power supply wires 26 supplies power to a motor 36. Motor 36 drives a shaft 38 about a central axis, which is also the rotational axis of rotor 20. A pair of one-way clutches 40 and 42 connect the shaft 38 to a first hub 50 and a second hub 44. The one-way clutch 42 and the one-way clutch 40 preferably transmit rotation in opposed directions. As an example, clutch 40 may allow clockwise rotation, while clutch 42 may only allow counter-clockwise rotation. One-way clutches are known, and a worker of ordinary skill in the art would be able to select an appropriate one-way clutch given the teachings of this application. The electric motor 36 is reversible. When the electric motor 36 rotates in a clockwise direction, rotation will be transmitted through the one-way clutch 40 to the hub 50, and a counterweight 52 will be rotated. Similarly, if the motor 36 is rotated in a counter-clockwise direction, the one-way clutch 42 will drive the hub 44 and a counterweight 46 will be rotated. A bearing and one-way clutch assembly 54 supports the counterweight 52 on the counterweight 46. The bearing 48 supports the both counterweights 46 and 52 on a housing 28 attached to the hub 20.

When the balance sensor 32 senses an imbalance, such as sensing an undue amount of vibration on the propeller rotor 20, then the motor 36 drives one of the counterweights 46 or 52 while continuing to monitor for imbalance. As the imbalance lessens, the controller 30 continues to move the counterweight 52 or 46 in that direction. If the imbalance increases, the controller may stop movement of one of the counterweight 52 or 46, and move the other.

The present invention thus provides an iterative method of not only correcting for imbalance at the time of assembly of a propeller rotor 20, but also one that can evolve and change the position of the counterweights 52 and 46 as the propeller rotor 20 experiences various flight conditions, and as it ages.

As shown somewhat schematically in FIG. 2 and as known to a worker of ordinary skill in the art, the counterweights 52 and 46 would not have a cylindrical symmetric shape, but instead would have a weight, such as shown at 100 and 101, which provides the counterweight effect. These weights are rotated by the motor 36 to reduce the imbalance sensed by the sensor 32.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propeller rotor comprising:
 a hub mounting a plurality of blades;
 a drive shaft for driving said hub, and said blades about a central axis;
 a motor being operably connected to drive at least one counterweight;
 a sensor for sensing vibration on said propeller rotor, and communicating with a controller, said controller controlling said motor to change a position of said counterweight in response to sensed vibration; and
 said motor drives at least two counterweights, through one-way clutches, with said motor being operable to rotate in opposed directions of rotation, and a first of said one-way clutches associated with a first of said counterweights transmits rotation when said motor is driven in a clockwise direction, and a second of said one-way clutches associated with a second of said counterweights transmits rotation when said motor is rotated in a counter-clockwise direction.

2. The propeller rotor as set forth in claim 1, wherein said motor is an electric motor, and electric power is transmitted to said electric motor through wires extending through a conduit positioned on said central axis.

3. The propeller rotor as set forth in claim 2, wherein said conduit rotates with said propeller rotor, and has slip rings which receive electric power from a power transfer brush block associated with said controller and are connected to the wires.

4. The propeller rotor as set forth in claim 3, wherein said controller controls the supply of an AC power supply to said brush block and through said slip rings to said wires and the electric motor.

5. The propeller rotor as set forth in claim 1, wherein said sensor continues to supply imbalance or vibration information to said controller as said electric motor adjusts at least one of said counterweights, and said controller moving said at least one of said counterweights in a direction to reduce the vibration sensed by said sensor.

6. The propeller rotor as set forth in claim 1, wherein said motor rotates said counterweight about a rotational axis of said propeller rotor.

7. A method of operating a propeller rotor comprising:
sensing vibration on said propeller rotor;
communicating with a controller controlling a motor to change a position of a counterweight in response to sensed vibration; and
said motor drives at least two counterweights, through one-way clutches, with said motor being operable to rotate in opposed directions of rotation, and a first of said one-way clutches associated with a first of said counterweights transmitting rotation when said motor is driven in a clockwise direction, and a second of said one-way clutches associated with a second of said counterweights transmitting rotation when said motor is rotated in a counter-clockwise direction.

8. The method as set forth in claim 7, including the step of transmitting electric power to said motor through wires extending through a conduit positioned on said central axis.

9. The method as set forth in claim 8, including the step of rotating said conduit with said propeller rotor, and providing slip rings which receive electric power from a power transfer brush block associated with said controller and connected to the wires.

10. The method as set forth in claim 9, wherein said controller controls the supply of an AC power supply to said brush block and through said slip rings to said wires and the electric motor.

11. The method as set forth in claim 7, including the step of continuing to supply imbalance or vibration information to said controller as set electric motor adjusts at least one of said counterweights, and said controller moving said at least one of said counterweights in a direction to reduce the vibration sensed by said sensor.

12. The method as set forth in claim 7, wherein said motor rotates said counterweight about a rotational axis of said propeller rotor.

* * * * *